United States Patent [19]

Sakamoto

[11] Patent Number: 5,029,258
[45] Date of Patent: Jul. 2, 1991

[54] IMAGE DISPLAY DEVICE AND ITS DRIVING METHOD

[75] Inventor: Yasutada Sakamoto, Kanazawa, Japan

[73] Assignees: NEC Home Electrons Co., Ltd., Osaka; NEC Kansai, Ltd., Otsu, both of Japan

[21] Appl. No.: 413,258

[22] Filed: Sep. 27, 1989

[30] Foreign Application Priority Data

Sep. 30, 1988 [JP] Japan .............................. 63-248310

[51] Int. Cl.$^5$ .......................... G09G 1/04; H01J 29/70
[52] U.S. Cl. ...................................... 315/366; 313/422
[58] Field of Search ........................ 315/366; 313/422

[56] References Cited

U.S. PATENT DOCUMENTS

| 4,028,582 | 6/1977 | Anderson et al. |
| 4,031,427 | 6/1977 | Stanley . |
| 4,088,920 | 5/1978 | Siekanowicz et al. |
| 4,117,368 | 9/1978 | Marlowe et al. ............ 315/366 |
| 4,121,130 | 10/1978 | Gange ........................ 313/415 |
| 4,227,117 | 10/1980 | Watanabe et al. |
| 4,622,492 | 11/1986 | Barten . |
| 4,622,497 | 11/1986 | Miyama et al. |
| 4,703,231 | 10/1987 | Tomii et al. |
| 4,736,139 | 4/1988 | Tomii et al. |

FOREIGN PATENT DOCUMENTS 0140037  6/1986  Japan .................. 315/366

Primary Examiner—Gregory C. Issing
Attorney, Agent, or Firm—W. G. Fasse; D. H. Kane, Jr.

[57] ABSTRACT

A large screen image display device has a rear wall on which a plurality of striped vertical addressing electrodes are formed, a front wall to which a conductor and phosphor are laminated, and mutually spaced side walls to form an evacuated enclosure wherein the conductor and the addressing electrodes confront each other. Linear thermal cathodes are disposed in rows orthogonal to the addressing electrodes for emitting thermal-electrons. At least one modulation electrode is located between the thermal cathodes and addressing electrodes in parallel to the respective thermal cathode. Horizontal focusing deflection electrodes are arranged opposite to and in parallel to both sides of the thermal cathodes. A control circuit supplies control signals to the above mentioned electrodes for operating the device.

12 Claims, 5 Drawing Sheets

IMAGE DISPLAY DEVICE AND ITS DRIVING METHOD

FIELD OF THE INVENTION

This invention relates to an image display device for a cathode luminescence system, and more particularly to an image display device suitable for a large, flat thin color television screen having a high definition. The invention relates also to a method for driving such a large screen.

BACKGROUND INFORMATION

Heretofore a luminescent type flat image display device, a plasma display, an EL display, fluorescent display tube, and a flat CRT have been known among other. However, the plasma display has a large in power consumption, the EL display has a low in the luminescence efficiency for the blue color, and the fluorescent display tube has a low in brightness in a full color display. By contrast, a system with luminescent cathodes has been known as a means for clearly and efficiently displaying color images, whereby the luminescent cathodes are part of a flat image display device. For example, flat panel display devices are shown in U.S. Pat. Nos. 4,028,582, 4,031,427, 4,088,920; 4,227,117; 4,622,497; 4,703,231; 4,736,139; and Japanese patent layed open publication Nos. 53-56961, 53-137665. Reinforcement partitions formed within an envelope for a picture display panel are shown in U.S. Pat. No. 4,622,492.

The conventional flat image display device, however, has the following problems.

1. It has been difficult to increase the resolution, and the colors tended to be uneven in a full color display.

2. The structure was complicated, and it was difficult to increase the screen size.

It has been difficult to obtain a high resolution because the brightness is modulated by the rows of back electrodes orthogonal to the linear thermal cathodes, and the electron beams emitted from the linear thermal cathodes toward the phosphor screen are spread widely. Particularly in the full color display, it is difficult for the electron beams to accurately energize the phosphors for each color of the three colors used, which results in an uneven color display.

The difficulty in increasing the size of the screen is due to the fact that the atmospheric pressure is applied to the evacuated thin-wall enclosure, that is, the strength of the enclosure is insufficient, whereby the enclosure is easily broken and it is difficult to manufacture.

OBJECTS OF THE INVENTION

It is an object of the invention to overcome these problems, and to provide an image display device in a new and improved structure advantageous for a large screen and a high resolution, and to also provide a driving method for such a screen.

SUMMARY OF THE INVENTION

The above problems have been solved by the invention in an image display device comprising:

(a) an evacuated enclosure having a rear wall on which a plurality of striped vertical addressing electrodes are formed, a front wall on which a phosphor screen and a conductive film are laminated to form a luminescent laminate and mutually spaced side walls keeping the front and rear walls substantially parallel to each other so that the conductive film and the addressing electrodes face each other.

(b) linear thermal cathodes disposed in rows close to the rear wall and extending orthogonally to the addressing electrodes, (c) modulation electrodes disposed in rows parallel to the linear thermal cathodes and in a position close to the addressing electrodes, and (d) horizontal focusing deflection electrodes disposed at a clearance from the front wall and in parallel on both sides of the linear thermal cathodes. The driving means for this image display device comprise a control circuit for vertical addressing for selectively and sequentially applying a specific voltage to the plurality of vertical addressing electrode strips, a horizontal addressing section for applying a specific voltage in sawtooth waveform to the horizontal focusing deflection electrodes, and modulation means for applying a brightness signal voltage to the modulation electrodes.

Furthermore, for the purpose of a full color display, in this basic structure, the luminescent laminate comprises phosphor strips of three colors arranged in the vertical direction. Further, according to the driving method of the invention the phosphor strips of three colors are energized by electron beams corresponding to the RGB signals, at the time of horizontal address selection by the driving control circuit.

For the purpose of achieving a large screen display, vertical support walls are disposed between the front and rear walls in the enclosure so as to form a plurality of partitions between which image display elements having linear thermal cathodes, modulation electrodes and horizontal focusing deflection electrodes are disposed. Furthermore, means are provided for compensating the potential difference of the upper and lower ends of the linear thermal cathodes, as required.

The linear sequential action of the vertical addressing strip electrodes in the vertical direction determines the electron emitting position from the linear thermal cathodes, and the beam intensity is varied by the modulation electrodes. The beam intensity is electrostatically focused and deflected in the horizontal direction by the horizontal focusing deflection electrodes, and the desired phosphor is excited, so that an image is displayed on the screen.

For this purpose a specific voltage is selectively and sequentially applied to the vertical addressing strip electrodes by the driving control circuit, and the electron emitting position of the linear thermal cathodes is determined, while the brightness signal voltage is applied to the modulation electrodes. Therefore, the electron beam is stabilized, and unnecessary spreading in the vertical direction is avoided. As a result, a high resolution is realized.

Further, the electrons emitted by the linear thermal cathodes are finely focused by the horizontal focusing deflection electrode, and the electrons are emitted to the phosphor strips of three colors (R, G, B) separated in the horizontal direction. Hence it is easy to precisely direct the electron beams modulated by R, G, B (red, green, blue) signals, onto the respective phosphors of R, G, B. Such precise direction of the energizing electron beams is advantageous for a high resolution color display.

For a large screen display, a plurality of image display elements formed by a linear thermal cathode, a pair of horizontal focusing deflection electrodes, and one modulation electrode, is disposed inside the present device, and support walls are provided between the individual image display elements, so that the enclosure may withstand the atmospheric pressure. Furthermore, as required, means for compensating the potential difference between the upper and lower ends of the linear thermal cathode, is provided to equalize the emitting by all parts of the linear thermal cathode. Accordingly, if the screen size is increased, the enclosure can be fabricated thinly and rigidly, and the brightness in the vertical direction may be made uniform at the same time.

DETAILED DESCRIPTION OF PREFERRED EMBODIMENTS

Figure 1:
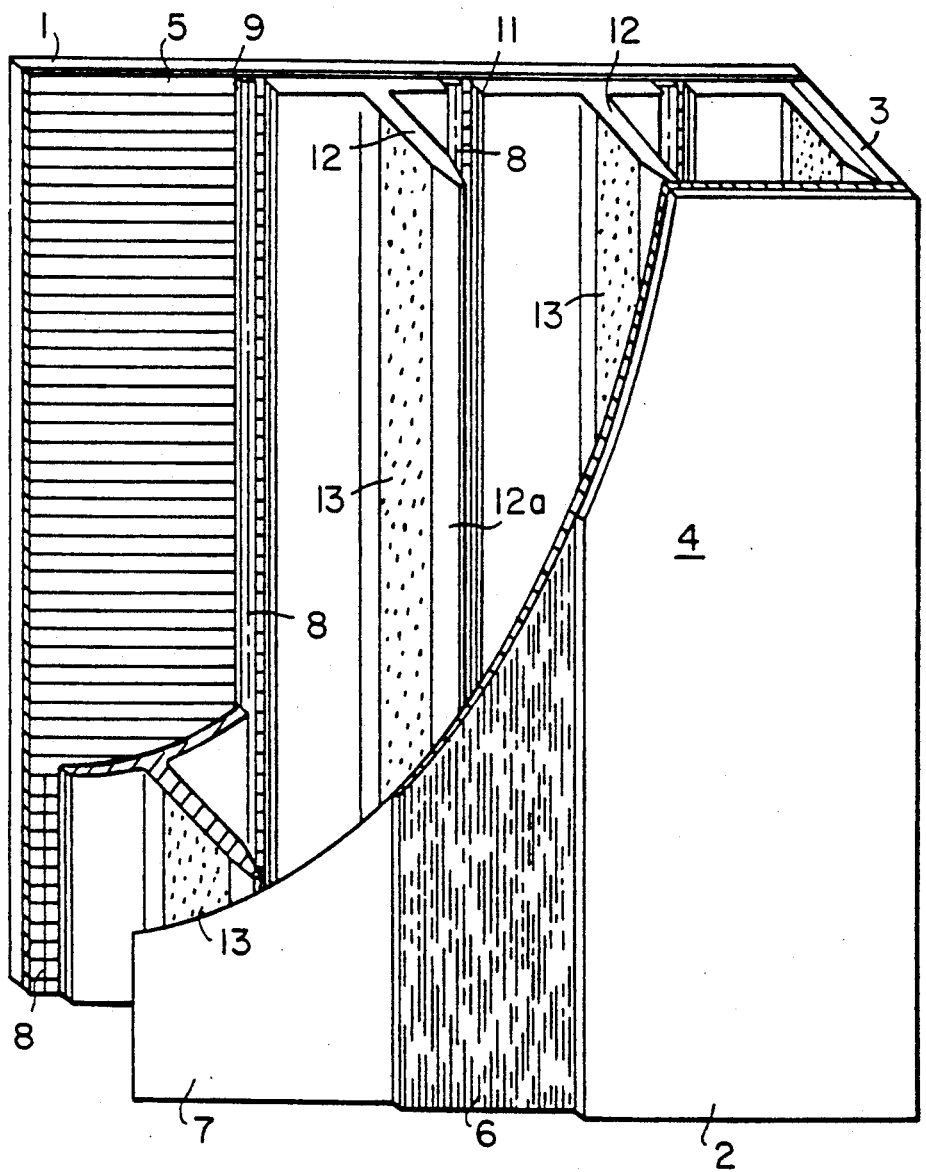
FIG. 1 is a partial perspective view showing a partial sectional view of an image display device of the invention.
Figure 2:
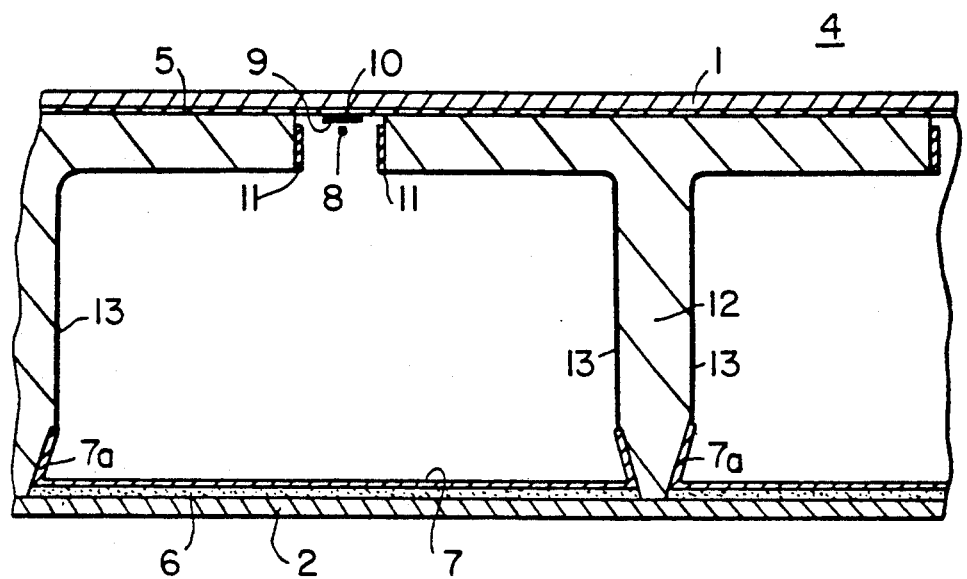
FIG. 2 is a cross sectional view along the horizontal direction in FIG. 1.

Referring first to FIGS. 1 and 2, the image display device of this invention comprises an envelope forming an evacuated enclosure 4 having a rear wall 1 as a back plate, a front wall 2 as a face plate and side walls 3 as the support elements. The inside surface of the rear wall 1 is provided with a plurality of vertical addressing strip electrodes 5 extending uninterrupted in the horizontal direction between both ends of the rear wall. The inside surface of the front wall 2 is provided with a luminescent layer 6 and a conductive layer or film forming an anode 7.

The luminescent layer 6 forms a phosphor screen made of phosphor strips emitting in the three colors red (R), green (G) and blue (B), and black stripes disposed between the phosphor strips. The anode 7 may be made a of transparent conductive film laminated to the front wall 2 instead of the metal back.

Figure 3:
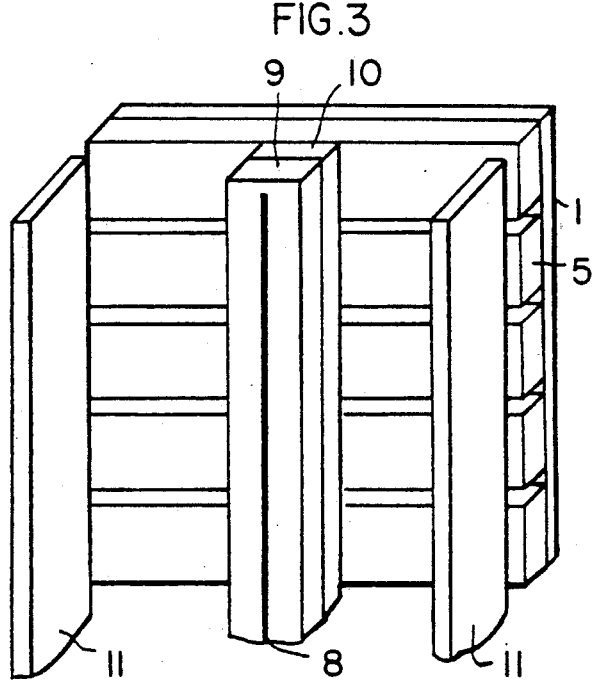
FIG. 3 is a perspective view, enlarging the peripheral parts of the linear thermal cathodes of the device shown in FIG. 1.

As the thermal-electron emitting means for generating electron beams, linear thermal strip cathodes 8 are disposed at intervals orthogonal to the horizontally arranged vertical addressing strip electrodes 5. A flat modulation electrode 9 is disposed behind the linear thermal cathodes 8 as the modulation means. The linear thermal cathodes 8 should be preferably mounted in such a manner that each cathode 8 is always provided with a tension by fitting leaf springs or the like (not shown) to one or both ends of these cathodes 8, in order to prevent loosening due to thermal expansion when power is supplied to the cathodes 8. The modulation electrode 9 insulated by an insulation layer 10 with respect to the vertical addressing horizontal strip electrodes 5 as shown in FIG. 3.

On the other hand, as the deflection means of electron beams, a pair of flat horizontal focusing deflection electrodes 11 is disposed in parallel to each other on both sides of the linear thermal cathodes 8. In the shown example, the flat horizontal focusing deflection electrodes 11 extending vertically are disposed perpendicularly to the front wall 2, but they may be disposed obliquely thereto. Support walls 12 for dividing the horizontal deflection range are disposed between the front wall 2 and the rear wall 1. Moreover, edges 7a of the anode 7 extend onto part of the support walls 12 to prevent a disturbance in the potential distribution by an unnecessary electric charge on the support walls 12, and to achieve a uniform luminescence by inhibiting the undesired deflection of electron beams. It is preferred to construct the side faces of the support walls 12 as high resistance conductive layers 13 of a graphite coating connected to the anode 7 or the like so as to prevent a disturbance of the internal electric field due to an undesired electric charge.

Incidentally, the support walls 12 should be preferably formed in a wedge shape having a thinner edge 12a at the front wall 2, whereby a fusion adhesion between the front wall 2 and the edges 12a is facilitated during assembly.

Figure 4:
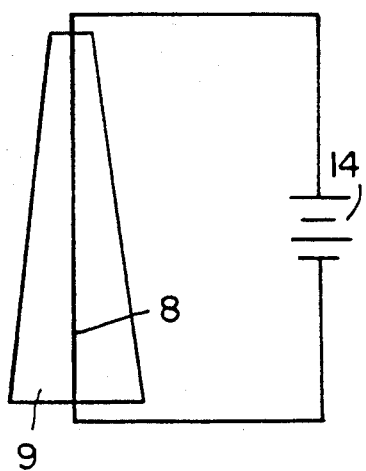
FIG. 4 is a schematic diagram showing an example of compensating means for eliminating a potential difference between both ends of the linear thermal cathodes in the image display device of FIG. 1.

For a large display screen, wherein the linear thermal cathodes 8 are extended in length, the potential difference of the heater voltage of a heater power source 14 between both ends of each cathode 8 is enlarged, whereby thermal-electron emission characteristic varies in the vertical direction. In such a case, the characteristic may be adjusted, for example, by means for compensating the potential difference to obtain a uniform electron emission characteristic in the vertical direction. Such compensation may be achieved by making the width of the modulation electrode 9 narrower at the higher potential location than at the lower potential location as shown in FIG. 4.

Figure 5:
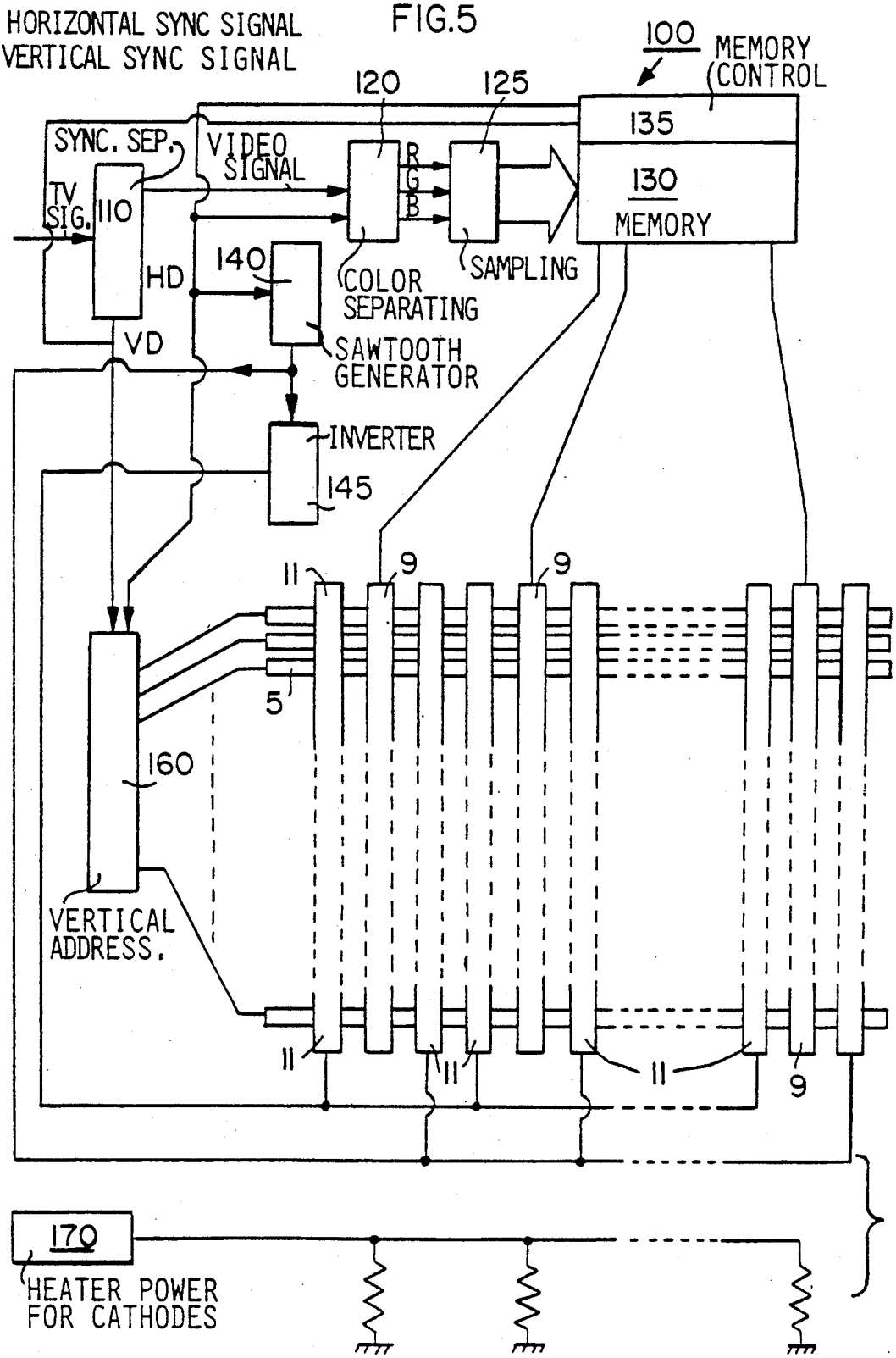
FIG. 5 is a driving circuit diagram for the present image display device.

A block diagram of a driving circuit 100 for controlling the electrodes and displaying an image will be explained below by referring to FIG. 5.

In the first place, the television signal is separated into a video signal, a horizontal sync signal, and a vertical sync signal in a sync signal separating circuit 110. The video signal is separated into R, G, and B signal components in a color signal separating circuit 120, and sampled in a sampling circuit 125, and is stored in a memory circuit 130. This memory information includes the digitally converted data of the brightness signals of the R, G, B colors for each picture element of one scanning line, and is stored by dividing, for example, into every 15 pixels consecutive in the horizontal direction, corresponding to each image display element divided in the horizontal direction by the support walls 12. The data accumulated in the memory circuit 130 is controlled by a memory control circuit 135, and is converted into analog data, and is by transmitted to the modulation electrodes 9 simultaneously and sequentially, for every image display element. Numeral 140 denoted a sawtooth wave generator circuit, and 145 is an inverter circuit. The sawtooth wave generated in the generator circuit 140 is transmitted to the horizontal focusing deflection electrode 11 extending vertically. A vertical address circuit 160 for determining the position in the vertical direction in which the electrons are emitted from the linear thermal cathodes 8 toward the screen, receives the vertical sync signal up, whereby, a specific voltage is selectively and sequentially applied to each vertical addressing strip electrode 5 extending horizontally. A heater power source 170 supplies an electric power for heating the linear thermal cathodes 8.

The operation of each electrode by the driving circuit 100 will now be described.

A specific voltage is applied only to one of the vertical addressing strip electrodes 5 extending horizontally, for example, the uppermost one, and the electrons are emitted only from the corresponding part of the linaer thermal cathodes 8. In this case, the other vertical addressing strip electrodes 5 not selected for an electron emission control are kept at a lower voltage than the specific voltage. The emitted electrons are focused and deflected in the horizontal direction by the horizontal focusing deflection electrode 11. The electrons are accelerated toward the anode 7 until colliding against the phosphor screen 6, thereby illuminating the R, G, B phosphors arranged in a strip. Here, focusing is caused by forming an electrostatic lens while keeping the potential of the horizontal focusing deflection electrode 11 at a specific value with respect to the vertical addressing strip electrodes 5 and the linear thermal cathodes 8. Deflection is effected, on the other hand, by varying the direction of the electrostatic lens by changing the potential difference of the confronting pair of horizontal focusing deflection electrodes 11. In other words, the emission point or point of impact of the electron beam at the phosphor screen 6 is on one of the phosphors of three colors sequentially arranged and separated by black strips. The impact point moves sequentially in the horizontal direction from R, G, B to R, G, B. Along with the shift of the emission point or impact point, a voltage corresponding to the brightness of the phosphor of each color being presently emitted is applied by the memory control circuit 130 135 and the memory circuit to the respective modulation electrode 9.

The above horizontal scanning and modulation operation are performed simultaneously on a plurality of image display elements separated by the support walls 12. That is, one linear thermal cathodes 8 takes charge of, for example, 15 horizontal pixels, and the electron beams emitted from individual linear thermal cathodes are simultaneously deflected to illuminate the fluorescent surface of the portion of one scanning line. When this display action for one scanning line is over, a selective voltage application to the vertical addressing strip electrodes 5 is changed to the addressing electrode 5 of the next line, and the same horizontal scanning and modulation operations are repeated. In this way, when such actions are preformed on all vertical addressing strip electrodes 5, an image of one frame is displayed.

Figure 6:
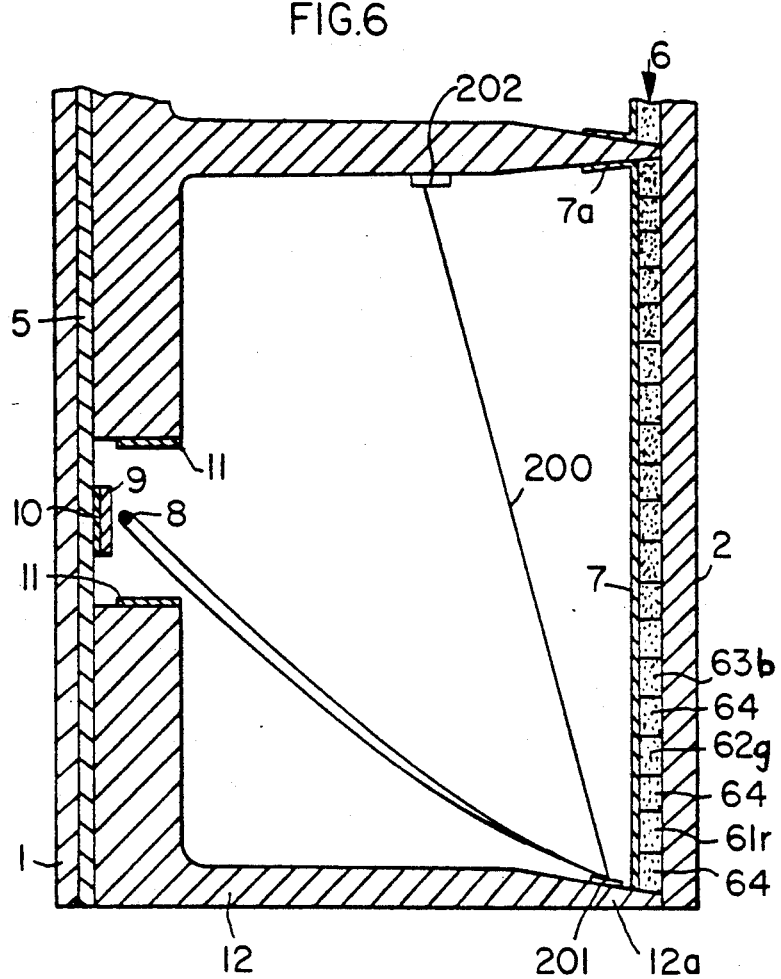
FIG. 6 is a cross sectional view showing the correspondence between three color phosphors and the respective electron beams of the image display device of the invention.

In order to achieve a more accurate matching of the electron beam impact points with the phosphor strips of three colors forming the luminescent screen 6, a beam index system as shown in FIG. 6 may be employed. More specifically, phosphor strip 61r, 62g, 63b, corresponding to red, green and blue, are arranged in the horizontal direction between black strips 64 of the light absorption or luminescent layer 6, and a phosphor sensor strip 201 for releasing an ultraviolet ray 200 is mounted on the part of the support wall 12 closest to the luminescent layer 6 with respect to the front wall 2. The ultraviolet ray 200 emitted by a collision of electron beams on the sensor strip 201 is detected by a photo detector 202 such as a photo diode or photo transistor which converts the ray 200 into an electrical signal, which controls the timing for emitting the R (red) signal in accordance with the change in the deflection voltage.

The details of the image display device shown in FIGS. 1 and 2 will be described below.

The gap between the linear thermal cathodes 8 and modulation electrode 9 is 0.1 mm to 0.2 mm, for example 0.1 mm. The gap between the linear thermal cathodes 8 and horizontal focusing deflection electrode 11 is 0.5 mm to 4 mm, for example 2 mm. The width of the horizontal focusing deflection electrode 11 is selected to be equal to or larger than the gap between the linear thermal cathodes 8 and the horizontal focusing deflection electrode 11. The width of the modulation electrode 9 is 0.3 mm to 1.5 mm, for example 0.4 mm. The modulation electrode 9 and vertical addressing strip electrodes 5 are insulated by a thin insulation layer 10. The gap between the linear thermal cathodes 8 and the front wall 2 is 2 mm, to 40 mm for example 30 mm. The pitch of the support walls 12 is 0.5 times to 2.0 times the gap between the linear thermal cathodes 8 and the front wall 2, for example 1 time. The width of the support walls 12 contacting with the front wall 2 is 0.1 mm to 0.3 mm, for example 0.1 mm.

According to this invention, a new cathode luminescent flat CRT which features both deflection and a matrix is proposed. The purpose of this system is to develope a full color CRT which has a large area 30 inches to 50 inches, and it is expected that the thickness of this flat CRT will be 30 mm to 60 mm for a 34 inches diagonal screens, and pixels in the three colors R, G, B will be 700×500. Because of its simple structure, low production costs can be achieved, and it will be possible to produce this device in small volume compared to normal CRTs. For each screen block, a line cathode 8 is biased in the vertical direction, and a modulation electrode a is placed in a parallel position behind the cathode 8. Vertical addressing electrodes 5 are aligned perpendicular to the modulation electrodes 9, and horizontal deflecting electrodes 11 are placed on either side of the cathode 8. In this case, a large area screen is easily obtained by connecting several blocks in a horizontal direction and using support walls 12 for supporting the vacuum in each block. For developing a large full color display, the inventor carried out an experiment for obtaining an optimal structure of electrodes in a vacuum chanmer, and the principle the construction of this device are defined by a displayed monochrome image on a 10×20 mm screen in a part of the whole screen area and 26×130 pixels of the image.

The invention is not limited to the foregoing particular embodiments alone, but various changes and modifications can be considered in many different ways.

For example, the image display device of the invention need not be necessarily be realized in full color display, and by using a monochromatic phosphor screen as a luminescent layer, a monochromatic display having a high resolution may be also realized.

Figure 7:
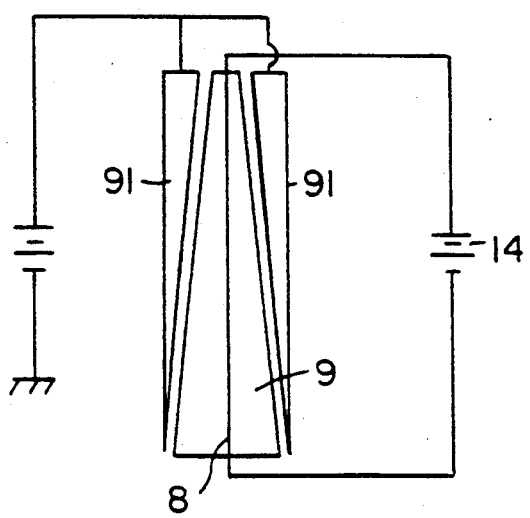
FIG. 7 is a schematic diagram showing another embodiment of the compensating means for eliminating a potential difference between the ends of the linear thermal cathodes shown in FIG. 4.

Moreover, as the means for compensating or eliminating the difference in the electron emission characteristic due to a potential difference between both ends of the linear thermal cathodes 8, aside from the structure shown in FIG. 7, it may be also possible to combine the modulation electrodes 9 and 91 differing in width as shown in FIG. 7.

The modulation electrode 9 may be mounted in different manners as will be explained below.

Figure 8:
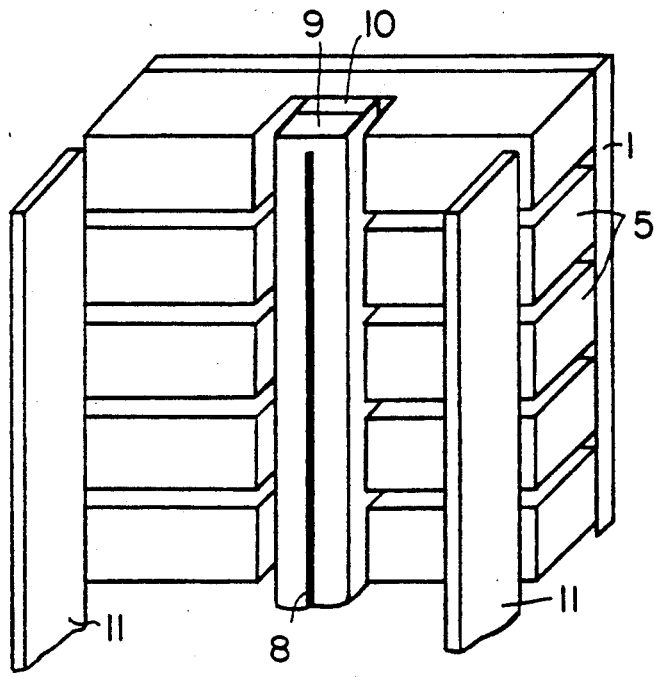
FIG. 8 and FIG. 9 are perspective views showing different configurations for illustrating the relationship between addressing electrodes and the modulation electrode.
Figure 9:
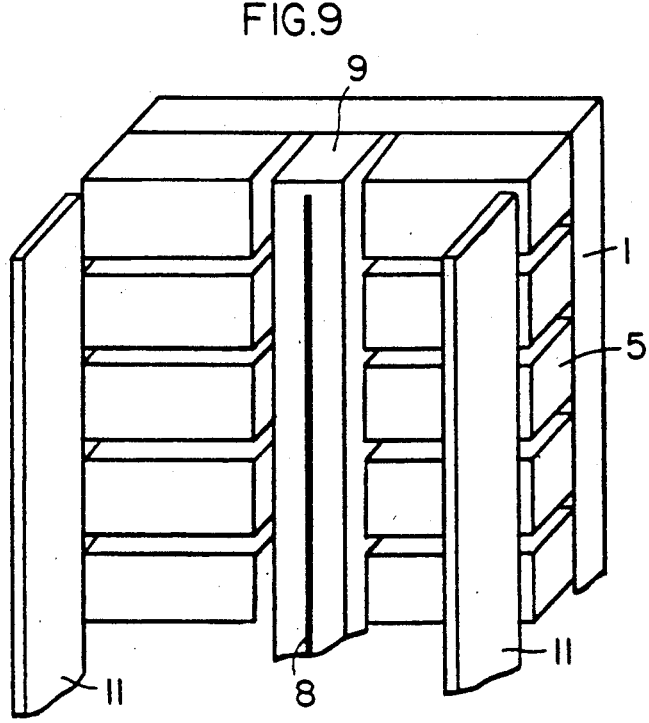

FIG. 8 shows the modulation electrode 9 recessed orthogonal in the vertical addressing strip electrodes 5. The electrodes extend in parallel to the linear thermal cathodes 8 and are insulated from the electrodes by the insulation layer 10. FIG. 9 shows the modulation electrode 9 which is placed in the space formed by cutting a groove in the addressing strip electrodes 5, without using an insulation layer.

This invention, therefore, facilitates the fabrication by the simplified structure composed of vertical addressing electrodes, modulation electrode and horizontal focusing deflection electrode. In particular, but not in a restrictive sense, it is extremely valuable as the flat image display device capable of satisfying all requirements of high definition, full color display, large screen display, and low power consumption.

What is claimed us:

1. An image display device, comprising an evacuated enclosure including a rear wall, a plurality of vertical addressing strip electrodes formed on said rear wall, a front wall, anode conductor means and phospor means on said front wall, mutually spaced side walls keeping said front wall and said rear wall substantially in parallel to each other, whereby said anode conductor means and said addressing strip electrodes are arranged opposite each other, linear thermal cathode means for emitting electrons, said linear thermal cathode means being arranged in rows orthogonal to said addressing strip electrodes, modulation electrode means disposed in parallel to said thermal cathode means, said modulation electrode means being located between said thermal cathode means and said addressing electrodes for forming a matrix with said addressing strip electrodes for an improved control of said electrons emitting thermal cathode means, and horizontal focusing deflection electrode means arranged in parallel to and opposite each other on opposite sides of said thermal cathode means, said focusing deflection electrode means being spaced from said front wall.

2. The image display device of claim 1, wherein said anode conductor means comprise a conductive film and said phosphor means comprise a phosphor screen, said conductive film and said phosphor screen being laminated to said front wall.

3. The image display device of claim 1, wherein said linear thermal cathode means are disposed close to said rear wall.

4. The image display device of claim 1, wherein said modulation electrode means are arranged close to said addressing strip electrodes.

5. The image display device of claim 1, wherein said horizontal focusing deflection electrode means comprise a first deflection electrode on one side of said linear thermal cathode means, and a second deflection electrode on the opposite side of said linear thermal cathode means, whereby said first and second deflection electrodes face each other and the linear thermal cathode means are arranged between said first and second deflection electrodes.

6. The image display device of claim 5, wherein said first and second deflection electrodes (11) are extending vertically.

7. The image display device of claim 5, wherein said first and second deflection electrodes (11) are inclined relative to said front wall.

8. The image display device of claim 1, further comprising driving circuit means including means for a vertical address selection for selectively and sequentially applying a specific voltage to said plurality of vertical addressing strip electrodes, horizontal address selection means for applying a specific voltage of sawtooth waveform to said horizontal focusing deflection electrode means, and modulation means for applying a brightness signal voltage to said modulation electrode means.

9. The image display device of claim 8, wherein said phosphor means comprise a phosphor screen including a plurality of phosphor strips of three colors (R, G, B) and black strips arranged in a strip layout extending vertically.

10. The image display device of claim 1, further comprising support walls disposed between said front wall and said rear wall of said enclosure, said support walls forming a plurality of partitions, said linear thermal cathode means. said modulation electrode means, and said horizontal focusing deflection electrode means forming an image display element between two neighboring partitions.

11. The image display device of claim 1, wherein said phosphor means comprise a phosphor screen including a plurality of phosphor strips of three colors (R, G, B) and black strips arranged in a strip layout extending vertically.

12. The image display device of claim 11, wherein two neighboring phosphor strips are separated from each other by a black strip.

* * * * *

UNITED STATES PATENT AND TRADEMARK OFFICE
CERTIFICATE OF CORRECTION

PATENT NO. : 5,029,258
DATED : July 2, 1991
INVENTOR(S) : Yasutada Sakamoto It is certified that error appears in the above-identified patent and that said Letters Patent is hereby corrected as shown below:

Title page:
 [73] Assignees: should read as follows:
   --NEC Home Electronics Co., Ltd., Osaka;
    NEC Kansai, Ltd., Otsu;
    both of Japan-- .

Signed and Sealed this

Thirteenth Day of October, 1992

Attest:

DOUGLAS B. COMER

Attesting Officer     Acting Commissioner of Patents and Trademarks